Nov. 21, 1939. J. F. MILLARD 2,180,689
FRUIT TREATING AND WASHING MACHINE
Filed Nov. 30, 1938 3 Sheets-Sheet 1
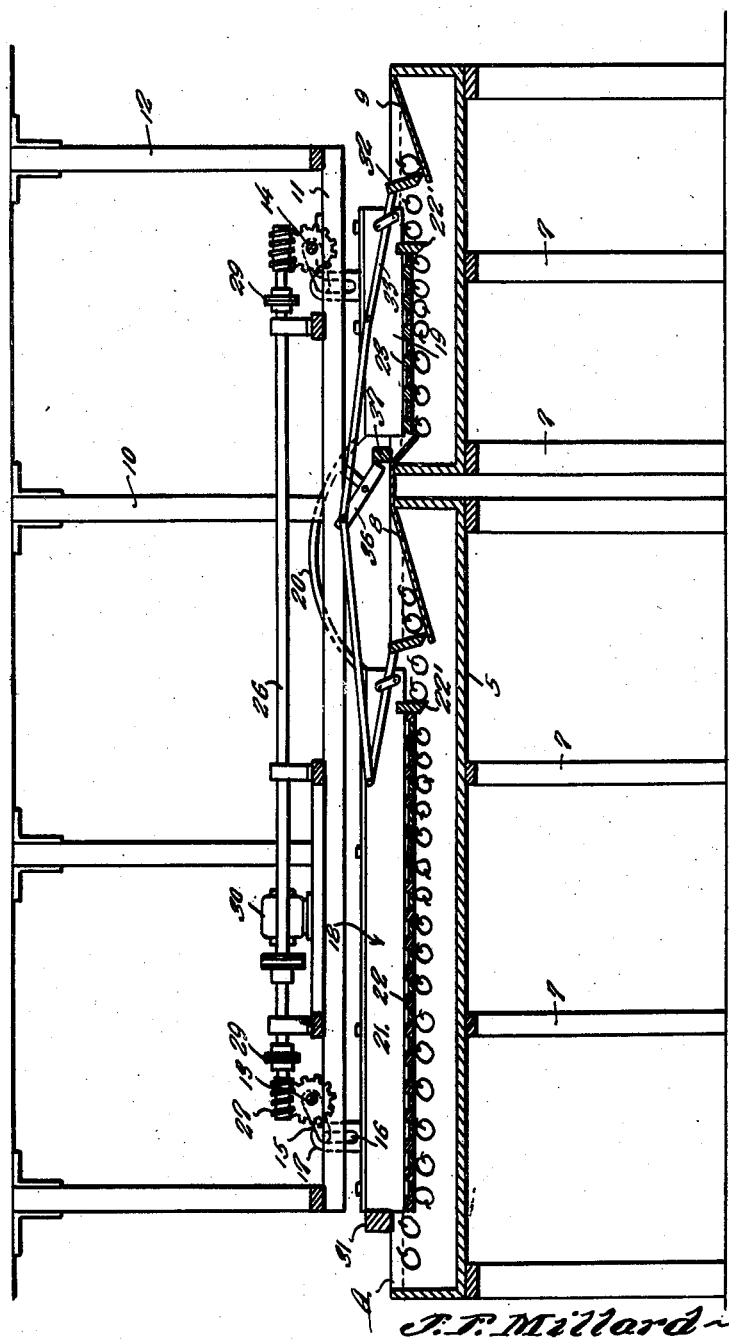
Inventor
J. F. Millard
By Clarence A. O'Brien
and Hyman Berman
Attorneys

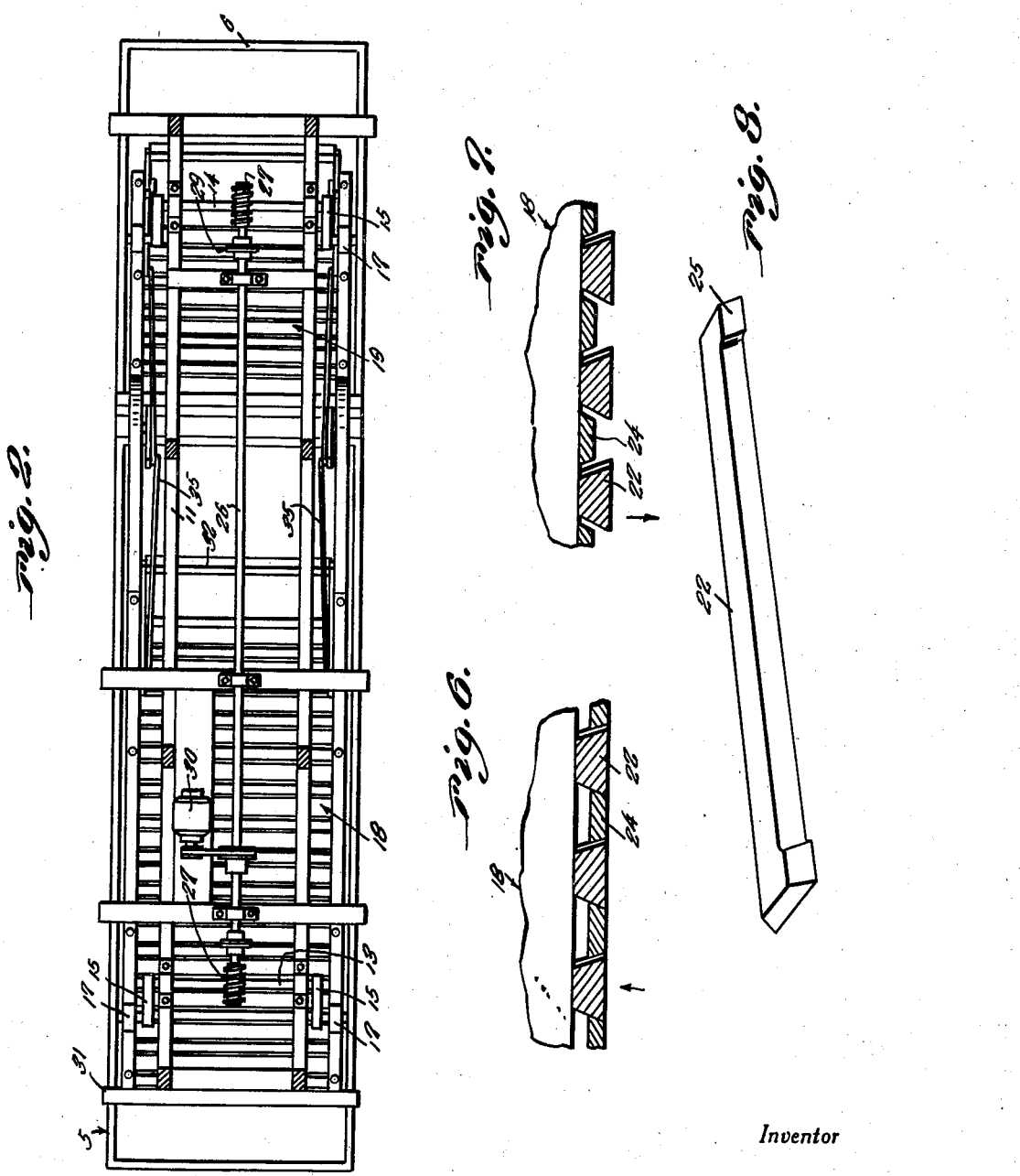

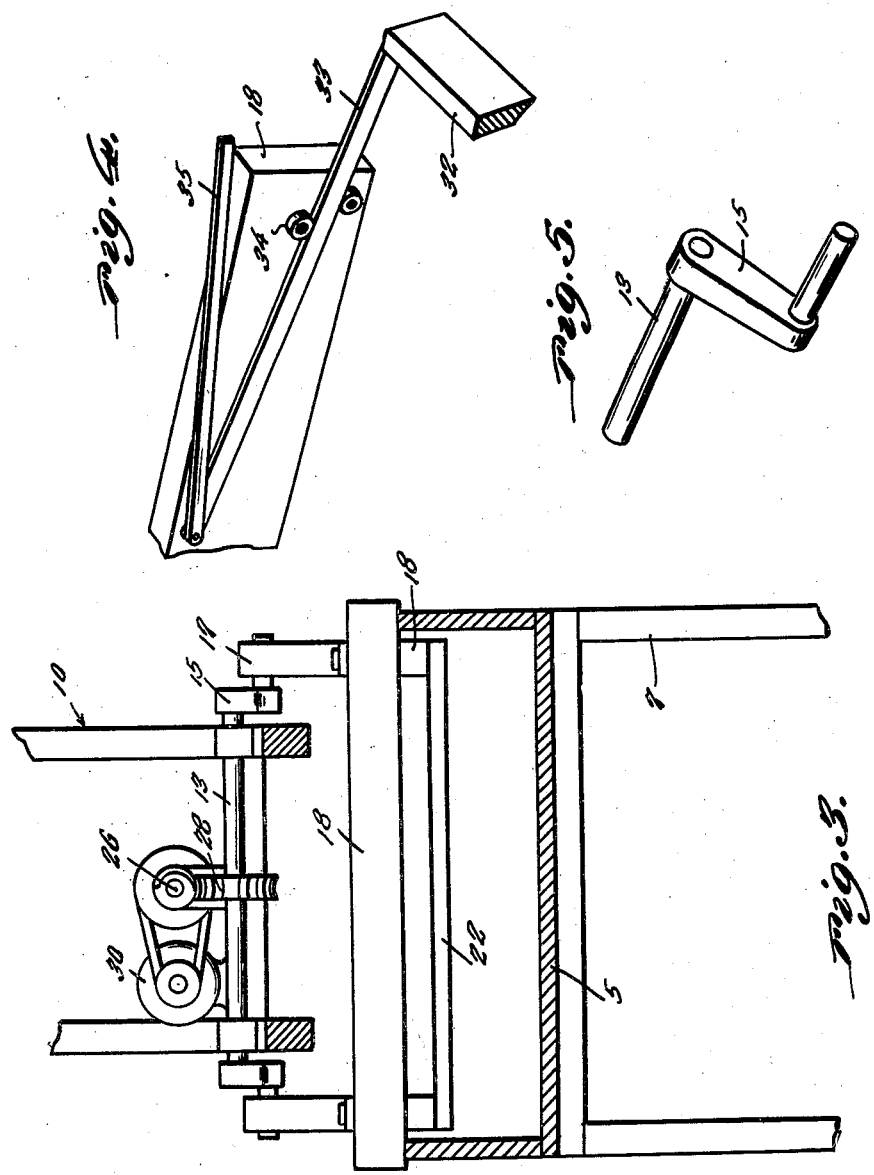

Patented Nov. 21, 1939

2,180,689

UNITED STATES PATENT OFFICE 2,180,689

FRUIT TREATING AND WASHING MACHINE

Jacob F. Millard, Gerrardstown, W. Va.

Application November 30, 1938, Serial No. 243,255

4 Claims. (Cl. 146—195)

This invention relates to fruit treating and washing machines, and has for the primary object the provision of a machine of the above stated character which will efficiently and inexpensively subject fruit in large amount to a chemical bath and then to a cleansing bath for removing the chemical solution, so that the fruit will be conditioned properly for marketing or for storage.

Another object of this invention is the provision of tanks, one of which contains a chemical solution and the other a cleansing fluid with means for advancing the fruit through the chemical bath and bringing about complete submerging of the fruit and also subjecting the fruit to a spray of the solution of the chemical bath and to advance the fruit into and through the cleansing bath and bring about the removal of the fruit from the latter-named bath whence it may drain preparatory to packing for shipment or storage.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 1 is a vertical sectional view illustrating a fruit treating and washing machine constructed in accordance with my invention.

Figure 2 is a top plan view, partly in section, illustrating the same.

Figure 3 is a fragmentary transverse sectional view illustrating the device.

Figure 4 is a fragmentary perspective view, partly in section, showing one of the arms employed for the support and operation of one of the fruit pushers.

Figure 5 is a fragmentary perspective view illustrating a part of one of the crank shafts.

Figure 6 is a fragmentary vertical sectional view showing a valve arrangement employed in the fruit submerging, advancing and spraying device with the valve elements thereof in a seated position for trapping the solution in said device for a comparatively slow escape therefrom.

Figure 7 is a view similar to Figure 6 showing the valve elements in unseated position.

Figure 8 is a perspective view illustrating one of the elements which goes to make up a valve seat for a valve element.

Referring in detail to the drawings, the numerals 5 and 6 indicate elongated tanks arranged in endwise relation and supported by series of legs 7. The tank 5 is adapted to be substantially filled with a chemical solution and of a character well known in the art of fruit treatment, while the tank 6 is adapted to contain a cleansing liquid such as water.

Fruit is fed into the end A of the tank 5 in any well known manner and the opposite end of the tank is provided with a ramp 8 which extends into the tank 6, as clearly shown in Figure 1. The tank 6 is also provided with a ramp 9 over which fruit may be moved when leaving the cleansing bath and drain thereon preparatory to packing for shipment or storage.

The natural tendency of fruit is to float in the chemical solution and in order that this fruit be thoroughly treated it must be completely submerged in the solution and then advanced from the solution over the ramp 8 into the cleansing bath in the tank 6 and again submerged and then removed from the cleansing bath by way of the ramp 9 for draining and removal from said ramp 9 in any well known manner. The present invention has for its purpose to bring about treatment of the fruit and the washing thereof, as heretofore described, and consists in a supporting structure 10 including a main frame 11 positioned over and a desired distance from the tanks 5 and 6. The main frame is carried by suspension members 12 fastened onto a ceiling of a room or the main frame 11 may be supported in the stated position in any other well known manner. Shafts 13 and 14 are journaled on the frame 11 adjacent the ends thereof and transversely of said frame and include at the ends thereof cranks 15 which extend into slots 16 of brackets 17. The brackets 17 are secured on fruit engaging members 18 and 19 operating in conjunction with the tanks 5 and 6 and connected together for movement in unison by arcuately curved brackets 20.

The fruit engaging members 18 and 19 are in the form of elongated frames 21 of a dimension to move freely within said tanks, each being of a length less than the length of its respective tank. The frame 21 of the fruit engaging member 18 has secured to its under side a plurality of relatively spaced transversely arranged slats or members 22. The frame 21 of the member 19 is provided with slats or members 23 arranged similarly to the arrangement of the slats or members 22. The slats or members 22 and 23 are substantially tenon-shaped in cross section, that is said slats or members have opposite faces thereof beveled. The slats or members 22 of the member 18 have operating therebetween elongated valve elements 24 each of slat formation and having beveled edges to match the beveled edges of the members or slats 22 of the frame 21. The valve elements 24 have a limited sliding movement between the slats or members 22 of the member 18, the slats or members 22 coacting with each other in forming valve seats for the valve elements 24. Each slat or member 22 has formed on one beveled face thereof bevel projections 25 defining therebetween a groove which is always spaced from a valve element 24 regardless of the position occupied by the latter.

As shown in Figure 6, the valve elements 24 are in seated position and as shown in Figure 7 the valve elements are in unseated position. The unseating of the valve elements is brought about by the submerging of the member 18 in the solution of the tank 5 so that a certain amount of the solution may pass freely through the valve elements and companion slats 22 thereof and as the member 18 rises from the solution a certain amount of the latter will be trapped for gradual escape from the member 18 and in sort of spray form to bring about spraying of the fruit floating in the solution of the tank 5. This operation will be more completely described hereinafter.

A drive shaft 26 extends longitudinally of the frame 11 and is journaled on the latter and has secured thereto worms 27 meshing with worm gears 28 secured on the shafts 13 and 14. The drive shaft 26 is preferably composed of sections connected together by couplings 29. A power source 30 which may be in the form of an electric motor, is mounted on the frame 11 and is belted or otherwise connected to the drive shaft 26 for the purpose of bringing about rotation of the crank shafts by the drive shaft.

Cross members 31 are secured on the frame 21 of the member 18 for limiting the downward movement of the frame 21 in the solution of the tank 5 and to act as guides or runners traveling on the upper edges of the tank 5 during a certain movement of the frame 21 of the fruit engaging device 18.

Operating over and in engagement with the ramps 8 and 9 are fruit pushers 32 connected to arms 33. The arm 33 of one of the pushers is slidably mounted on the frame 21 of the member 18 while the arms of the other pushers are slidably mounted on the member 19. The mountings for the arms 33 are in the form of spaced rollers 34 better shown in Figure 4, whereby said arms are slidably supported at a desired inclination to bring about proper movement of the fruit pushers with respect to the ramps 8 and 9 during the travel of the fruit engaging devices 18 and 19. Links 35 are pivotally connected to the arms and to ends of trip levers 36 pivoted on the brackets 20.

A stop 37 is provided on the tank 6 to be engaged by the trip levers 36 during the movement of the fruit engaging members or devices 18 and 19 toward the discharge end of said tanks for the purpose of bringing about a movement of the fruit pushers 32 at an advanced rate movement over the ramps 8 and 9 from that taken by the fruit engaging devices 18 and 19 during their movement toward the discharge ends of the tanks or toward the ramps so that fruit which may be on the ramps will be advanced thereover making way for further fruit being advanced in the tanks by the fruit engaging devices moving toward the discharge ends of said tanks.

During the movement of the fruit engaging devices 18 and 19 toward the discharge end of the tanks said devices move in a substantially horizontal plane due to the members 31 sliding upon the upper edge of the tank 5. Said horizontal movement of the members or devices 18 and 19 bring about a complete submerging of the fruit engaged thereby and also advancing said fruit toward the ramps of said tanks. As said devices 18 and 19 complete their horizontal movements toward the ramps the cranks elevate and return said devices 18 and 19 to their initial position by traveling in the arc of a circle due to the cranks 15 operating in the brackets 17. During the latter-named movement of the device 18 a certain amount of the solution will be picked up thereby due to the valve arrangement heretofore described and lifted and permitted to drain back into the tank in substantially spray form to bring about spraying of the fruit now floating on the surface of the solution in the tank 5.

It will be seen through the arrangement of the pushers 32 the fruit will be advanced from the tank 5 into the tank 6 and from the latter-named tank outwardly over the ramp 9. Further, it will be seen that the fruit engaging devices 18 and 19 during their movements in a horizontal plane bring about a gradual advancement of the fruit through the liquid of the tanks 5 and 6 with the fruit completely submerged and caused to move or change its position in the liquid in the tanks.

Transversely arranged fruit pushers 22' are mounted on the frames of the fruit engaging devices 18 and 19 and are located adjacent the ends of said frames next to the ramps for shoving the fruit toward said ramps during the movement of the devices 18 and 19, toward the discharge ends of the tanks 5 and 6.

It is believed that the simplicity and advantages of this invention will be perfectly apparent to those skilled in the art to which such a device relates, and while I have herein set forth a satisfactory embodiment of the invention, it is to be understood that certain changes therefrom as fairly fall within the scope of my claims may be resorted to when desired.

Having thus described my invention, what I claim is:

1. A fruit treating and washing machine comprising elongated liquid containing tanks arranged in endwise relation, a transfer ramp extending from one of said tanks into the other of said tanks, a ramp located at one end of one of the tanks, fruit advancing and submerging devices slidable on said tanks during the movement thereof toward the ramp and extending into the liquid of said tanks, a supporting means arranged over said tanks, crank devices journaled on said supporting means, means connecting said crank devices to the fruit advancing and submerging devices to reciprocate the latter and to elevate said fruit advancing and submerging devices clear of the liquid of said tanks during the movement thereof away from the ramps, means for connecting said crank devices to a power source, and means on said fruit advancing and submerging devices to advance fruit over the ramps during the movement of said fruit advancing and submerging devices toward the ramps.

2. A fruit treating and washing machine comprising elongated liquid containing tanks arranged in endwise relation, a transfer ramp extending from one of said tanks into the other tank, a ramp located at one end of one of the tanks, fruit advancing and submerging devices slidable on said tanks during the movement thereof toward the ramps and extending into the liquid of said tanks, means connecting said devices, a supporting means arranged over said tanks, crank devices journaled on said supporting means, means connecting said crank devices to the fruit advancing and submerging devices to reciprocate the latter and to elevate said fruit advancing and submerging devices clear of the liquid of said tanks during the movement thereof away from the ramps, each of said fruit advancing and submerging devices including a frame and a series of horizontally arranged slats secured on the frame in spaced relation and having beveled faces to provide seats and slats having beveled faces to engage said seats and movable off of said seats by floating on the liquid in the tanks to permit the liquid to pass freely between the first-named slats and adapted to gravitate into engagement with the seats when elevated from the liquid to permit gradual escape of the liquid trapped over said slats during the movement of the fruit advancing and submerging devices away from the ramps, means for connecting said crank devices to a power source, and means on said fruit advancing and submerging devices to advance fruit over the ramps during the movement of said fruit advancing and submerging devices toward said ramps.

3. A fruit treating and washing machine comprising elongated liquid containing tanks arranged in endwise relation, a transfer ramp extending from one of said tanks into the other tank, a ramp located at one end of one of the tanks, fruit advancing and submerging devices slidable on said tanks during the movement thereof toward the ramps and extending into the liquid of said tanks, means connecting said devices, a supporting means arranged over said tanks, crank devices journaled on said supporting means, means connecting said crank devices to the fruit advancing and submerging devices to reciprocate the latter and to elevate said fruit advancing and submerging devices clear of the liquid of said tanks during the movement thereof away from the ramps, each of said fruit advancing and submerging devices including a frame and a series of horizontally arranged slats secured on the frame in spaced relation and having beveled faces to provide seats and slats having beveled faces to engage said seats and movable off of said seats by floating on the liquid in the tanks to permit the liquid to pass freely between the first-named slats and adapted to gravitate into engagement with the seats when elevated from the liquid to permit gradual escape of the liquid trapped over said slats during the movement of the fruit advancing and submerging devices away from the ramps, means for connecting said crank devices to a power source, arms slidably mounted on said fruit advancing and submerging devices, members carried by said arms to sweep over said ramps during the movement of said fruit advancing and submerging devices toward the ramps, and a connecting means between the arms of said fruit advancing and submerging devices.

4. A fruit treating and washing machine comprising elongated liquid containing tanks arranged in endwise relation, a transfer ramp connecting said tanks, a ramp located at one end of one of the tanks, fruit advancing and submerging devices slidable on said tanks during the movement thereof toward the ramps and extending into the liquid of said tanks, a supporting means arranged over said tanks, crank devices journaled on said supporting means, means connecting said crank devices to the fruit advancing and submerging devices to reciprocate the latter and to elevate said fruit advancing and submerging devices clear of the liquid of said tanks during the movement thereof away from the ramps, means for connecting said crank devices to a power source, means on said fruit advancing and submerging devices to advance fruit over the ramps during the movement of said fruit advancing and submerging devices toward the ramps, each of said fruit advancing and submerging devices including a frame having a slotted bottom wall, and slats operating in said slots to open the latter when contacted with the liquid of the tank and to partly close said slots on movement out of the liquid of the tank.

JACOB F. MILLARD.